Jan. 12, 1926.
A. MAJOR
1,569,825
CAN HOLDER
Filed June 22, 1925
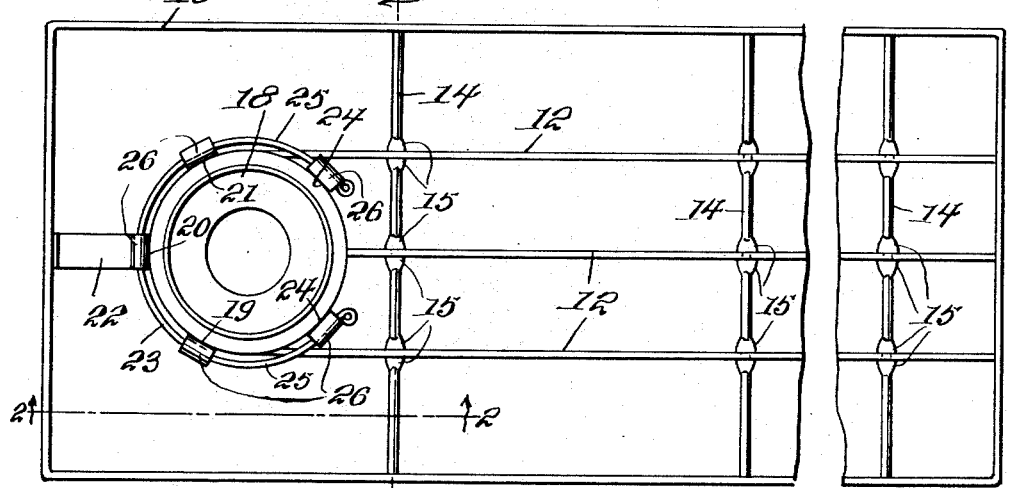
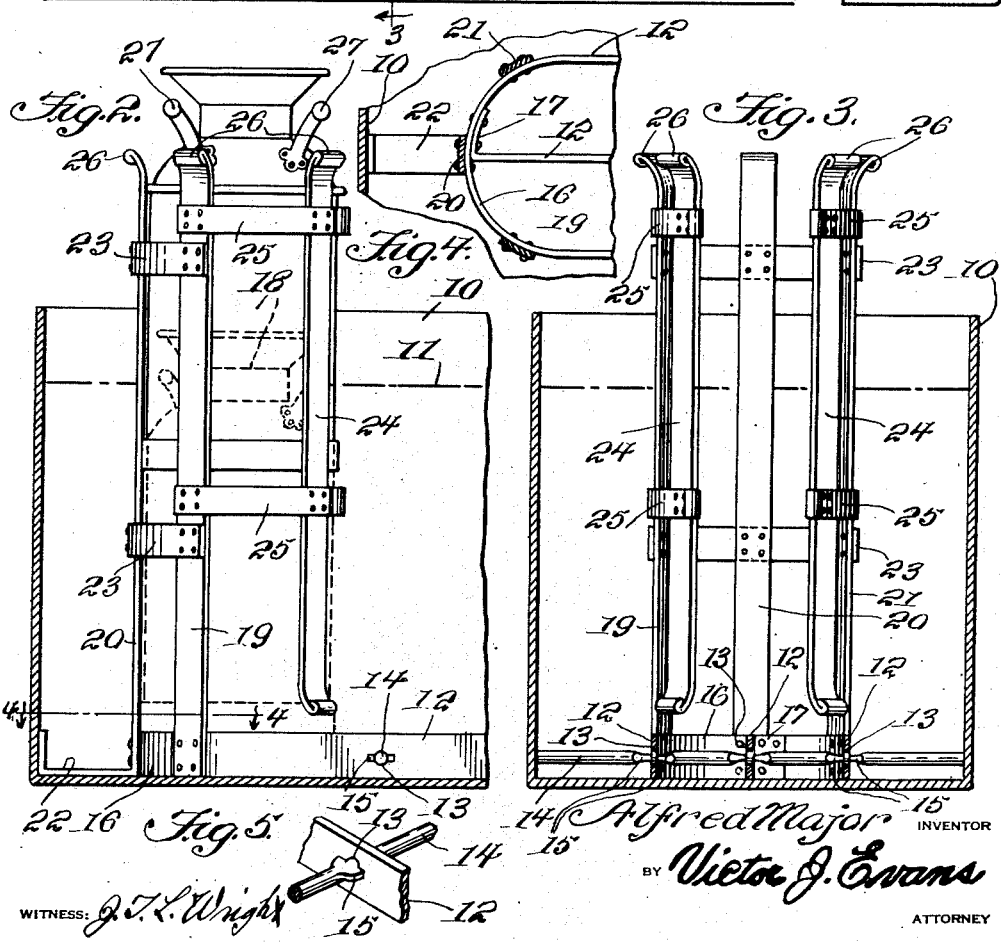
INVENTOR
Alfred Major
BY Victor J. Evans
ATTORNEY
WITNESS: J. T. L. Wright Patented Jan. 12, 1926.

1,569,825

UNITED STATES PATENT OFFICE.

ALFRED MAJOR, OF HOLLAND, NEW YORK.

CAN HOLDER.

Application filed June 22, 1925. Serial No. 38,890.

*To all whom it may concern:*

Be it known that I, ALFRED MAJOR, a citizen of the United States, residing at Holland, in the county of Erie and State of New York, have invented new and useful Improvements in Can Holders, of which the following is a specification.

This invention relates to can holders, and has particular application to a holder designed to support an empty milk can or the like in an elevated position within the cooling tank, and allow the can to lower itself as it is filled with milk, the present invention contemplating certain improvements over Patent 1,532,913 issued to me on April 7, 1925.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a top plan view partly broken away.

Figure 2 is a sectional view on line 2—2 of Figure 1.

Figure 3 is a sectional view on line 3—3 of Figure 1.

Figure 4 is a fragmentary plan view of the cooling tank with the holder shown in section.

Fig. 5 is a fragmentary enlarged view of the connection between certain parts.

Referring to the drawing in detail, 10 indicates a cooling tank of any well known construction adapted to contain a quantity of water or other fluid in which milk cans are arranged for the purpose of maintaining the milk in a cool condition, the level of the liquid contained in the tank being indicated at 11. It is the purpose of this invention to provide means for holding such cans in an upright elevated position when in the tank, when said cans are empty, and allow the cans to lower themselves by the weight of their contents while said cans are being filled.

The means for this purpose embodies a plurality of spaced parallel bars 12 arranged along the bottom of the tank 10 longitudinally thereof, the bars being arranged edgewise and provided with aligned openings 13 to receive transverse rods 14 which connect the bars 12 together and hold them fixed relatively equi-distantly spaced apart. It will be noted upon inspection of the drawing, especially Figure 5, that each rod 14 is flattened as at 15 at each side of the bar 12, to prevent relative movement of the parts, while the transverse rods 14 are adapted to contact the opposed side walls of the tank 10 as illustrated in Figure 1. It might be stated that the rods 14 can be made in any desired length, and have their ends cut off to permit the structure thus far described to accommodate itself to tanks of different sizes. In accordance with the present invention, the outermost bars 12 are connected at one end by a curved portion 16 which preferably forms an integral part of these bars, while the intermediate bar 12 has its adjacent end offset as at 17 and riveted or otherwise suitably secured to the curved portion 16. By reason of this construction it is not necessary to twist the vertically disposed flat bars forming the holder proper in the manner which was found necessary in the invention described in the patent above referred to.

The holder proper is made up of an annular series of vertically disposed flat bars, suitably spaced apart to provide a holder of proper diameter to receive milk cans of ordinary well known construction indicated at 18. While any number of these flat bars may be employed, I preferably make use of five of such bars and three of these are stationary, being riveted or otherwise suitably secured to the curved portion 16 of the bars 12 above described. The three stationary bars of the holder proper are indicated at 19, 20 and 21 respectively, the bar 20 being the intermediate bar having its lower end offset as at 22, which offset extremity reposes upon the bottom of the tank 10 and is also arranged in contacting engagement with the adjacent end wall thereof. These bars are also connected together and suitably braced by arcuate shaped straps 23. In addition to the three bars just mentioned, the holder also includes a pair of similar bars 24, the lower ends of which are spaced from the bars 12 secured to the bottom of the tank 10, inasmuch as the last mentioned bars 24 are yieldably supported upon the adjacent stationary bars by springs 25, and are therefore adapted to be moved away from each other when the can 18 is inserted within or removed from the holder at the front thereof. When all of the bars of the holder are in their normal positions, the holder surrounds the can 18 and prevents the latter from tilting in any direction as it floats upon the liquid contained in the tank 10 and therefore maintains an empty can in the upright elevated position as shown in Figure 2. The can however is not tightly embraced by the holder, so that when the can is being filled with milk or other liquid, the said can is allowed to gravitate within the tank and guided in its movements by means of the holder described. It will also be noted upon inspection of Figure 3 that the corresponding upper ends of the bars forming the holder are flared outwardly to facilitate the insertion of a can within the holder or its removal therefrom through the top of said holder, and also permit a proper hold to be obtained upon the handle 27 of the can as the occasion may require.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

The combination with a cooling tank for cans, of a can holder comprising a plurality of spaced bars arranged edgewise along the bottom of the tank longitudinally thereof, and connected at one end by an integrally curved portion, a holder proper including a plurality of vertically disposed stationary bars supported by said curved portion, and a plurality of relatively movable bars yieldably supported on the stationary bars, all of said bars being arranged in an annular series and having their upper ends flared outwardly.

In testimony whereof I affix my signature.

ALFRED MAJOR.